United States Patent
Birkholz et al.

(10) Patent No.: US 10,875,413 B2
(45) Date of Patent: Dec. 29, 2020

(54) SHEAR PANEL WITH SECONDARY COIL FOR A FORWARD STRUCTURE OF A BODY OF A VEHICLE, AND VEHICLE

(71) Applicant: Bayerische Motoren Werke Aktiengesellschaft, Munich (DE)

(72) Inventors: Andreas Birkholz, Munich (DE); Jochen Muellhaeuser, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 150 days.

(21) Appl. No.: 15/287,904

(22) Filed: Oct. 7, 2016

(65) Prior Publication Data
US 2017/0021734 A1  Jan. 26, 2017

Related U.S. Application Data

(63) Continuation of application No. PCT/EP2015/052968, filed on Feb. 12, 2015.

(30) Foreign Application Priority Data

Apr. 8, 2014 (DE) .................. 10 2014 206 739

(51) Int. Cl.
*B60L 53/12* (2019.01)
*B60L 53/122* (2019.01)
(Continued)

(52) U.S. Cl.
CPC .......... *B60L 53/122* (2019.02); *B60L 11/182* (2013.01); *B62D 35/02* (2013.01); *H02J 7/0042* (2013.01);
(Continued)

(58) Field of Classification Search
CPC ....... B60L 11/182; H02J 7/025; H02J 7/0042; B62D 35/02
(Continued)

(56) References Cited

U.S. PATENT DOCUMENTS 4,800,328 A * 1/1989 Bolger .................. B60L 5/005
191/10
5,264,776 A * 11/1993 Hulsey .................. B60L 3/0069
320/108
(Continued)

FOREIGN PATENT DOCUMENTS

DE  10 2011 100 323 A1  11/2012
DE  10 2011 056 807 A1   6/2013
(Continued)

OTHER PUBLICATIONS

English Translation of Butot (FR 2976152), cited by information disclosure statement filed Oct. 7, 2016, included; translated by USPTO translation department Dec. 4, 2019.*
(Continued)

*Primary Examiner* — John T Trischler
(74) *Attorney, Agent, or Firm* — Crowell & Moring LLP

(57) ABSTRACT

A shear panel for a forward structure of a body of a vehicle includes a receiving area having fastening devices for mechanically fastening a secondary coil of an inductive energy transmission system configured to charge an electric energy accumulator of the vehicle. The shear panel may be made of metal.

22 Claims, 3 Drawing Sheets

(51) Int. Cl.
  B62D 35/02 (2006.01)
  B60L 11/18 (2006.01)
  H02J 7/00 (2006.01)
  H02J 7/02 (2016.01)
  B60K 1/04 (2019.01)

(52) U.S. Cl.
  CPC ............... H02J 7/025 (2013.01); *B60K 1/04* (2013.01); *B60L 2240/36* (2013.01); *B60Y 2200/91* (2013.01); *B60Y 2200/92* (2013.01); *B60Y 2410/10* (2013.01); *Y02T 10/70* (2013.01); *Y02T 10/7072* (2013.01); *Y02T 10/82* (2013.01); *Y02T 10/88* (2013.01); *Y02T 90/12* (2013.01); *Y02T 90/14* (2013.01); *Y10S 903/904* (2013.01)

(58) Field of Classification Search
  USPC ....................................................... 320/108
  See application file for complete search history.

(56) References Cited

U.S. PATENT DOCUMENTS

| | | | | |
|---|---|---|---|---|
| 5,821,728 A * | 10/1998 | Schwind | ............... | B60L 11/182 320/108 |
| 8,212,520 B2 * | 7/2012 | Takada | ................... | B60L 11/182 320/108 |
| 8,421,410 B2 * | 4/2013 | Takada | ................... | B60L 11/182 320/108 |
| 8,421,411 B2 * | 4/2013 | Takada | ................... | B60L 11/182 320/108 |
| 8,766,591 B2 * | 7/2014 | Takada | ................... | B60L 11/182 320/108 |
| 8,901,778 B2 * | 12/2014 | Kesler | ...................... | H03H 7/40 307/104 |
| 8,928,276 B2 * | 1/2015 | Kesler | ...................... | H02J 17/00 320/108 |
| 8,933,594 B2 * | 1/2015 | Kurs | ........................ | B60L 3/003 307/326 |
| 8,937,454 B2 * | 1/2015 | Baarman | ............... | B60L 11/182 320/108 |
| 9,106,083 B2 * | 8/2015 | Partovi | ................... | H02J 7/025 |
| 9,112,362 B2 * | 8/2015 | Partovi | ................... | H02J 7/025 |
| 9,112,363 B2 * | 8/2015 | Partovi | ................... | H02J 7/025 |
| 9,112,364 B2 * | 8/2015 | Partovi | ................... | H02J 7/025 |
| 9,120,506 B2 * | 9/2015 | Isakiewitsch | .......... | B62D 21/11 |
| 9,178,369 B2 * | 11/2015 | Partovi | ................... | H02J 7/025 |
| 9,543,781 B2 * | 1/2017 | Asselin | ...................... | H01F 3/10 |
| 9,565,794 B2 * | 2/2017 | Kanno | ................... | H01F 27/362 |
| 9,614,396 B1 * | 4/2017 | Bait-Suwailam | ....... | H02J 7/025 |
| 9,701,212 B2 * | 7/2017 | Baarman | ............... | B60L 11/182 |
| 9,751,415 B2 * | 9/2017 | Czainski | ................. | H01F 27/36 |
| 9,843,217 B2 * | 12/2017 | Atasoy | .................... | H02J 7/025 |
| 9,947,462 B2 * | 4/2018 | Kanno | ................... | H01F 27/362 |
| 10,305,239 B2 * | 5/2019 | Degen | ...................... | B23K 1/0004 |
| 2010/0065352 A1 * | 3/2010 | Ichikawa | ............... | B60L 11/182 180/65.8 |
| 2010/0117596 A1 * | 5/2010 | Cook | ...................... | B60L 11/182 320/108 |
| 2010/0156346 A1 * | 6/2010 | Takada | ................... | B60L 11/182 320/108 |
| 2010/0277121 A1 * | 11/2010 | Hall | ...................... | B60L 11/182 320/108 |
| 2011/0148351 A1 * | 6/2011 | Ichikawa | ............... | B60L 11/182 320/108 |
| 2011/0181240 A1 * | 7/2011 | Baarman | ............... | B60L 11/182 320/108 |
| 2012/0062172 A1 * | 3/2012 | Takada | ................... | B60L 11/182 320/108 |
| 2012/0228953 A1 | 9/2012 | Kesler et al. | | |
| 2012/0235636 A1 * | 9/2012 | Partovi | ................... | H02J 7/025 320/108 |
| 2012/0242286 A1 * | 9/2012 | Takada | ................... | B60L 11/182 320/108 |
| 2012/0242287 A1 * | 9/2012 | Takada | ................... | B60L 11/182 320/108 |
| 2013/0093390 A1 * | 4/2013 | Partovi | ................... | H02J 7/025 320/108 |
| 2013/0119927 A1 * | 5/2013 | Partovi | ................... | H02J 7/025 320/108 |
| 2013/0119928 A1 * | 5/2013 | Partovi | ................... | H02J 7/025 320/108 |
| 2013/0119929 A1 * | 5/2013 | Partovi | ................... | H02J 7/025 320/108 |
| 2014/0008995 A1 * | 1/2014 | Kanno | ................... | H01F 27/362 307/104 |
| 2014/0145423 A1 * | 5/2014 | Isakiewitsch | .......... | B62D 21/11 280/781 |
| 2014/0327394 A1 * | 11/2014 | Asselin | ...................... | H01F 3/10 320/108 |
| 2014/0346815 A1 | 11/2014 | Keutz et al. | | |
| 2015/0069967 A1 * | 3/2015 | Baarman | ............... | B60L 11/182 320/108 |
| 2015/0075934 A1 * | 3/2015 | Czainski | ................. | H01F 27/36 191/10 |
| 2015/0262750 A1 * | 9/2015 | Blum | ........................ | H01F 27/36 320/108 |
| 2015/0290373 A1 * | 10/2015 | Rudser | ................ | A61M 1/1086 623/3.27 |
| 2016/0143194 A1 * | 5/2016 | Yanagida | ............. | B60L 11/1833 307/104 |
| 2016/0197511 A1 * | 7/2016 | Atasoy | .................... | H02J 7/025 307/104 |
| 2017/0110242 A1 * | 4/2017 | Kanno | ................... | H01F 27/362 |

FOREIGN PATENT DOCUMENTS

| | | |
|---|---|---|
| DE | 10 2012 202 472 A1 | 8/2013 |
| EP | 2 738 069 A2 | 6/2014 |
| FR | 2 976 152 A1 | 12/2012 |
| GB | 2505493 A | 3/2014 |
| JP | 2012-257445 A | 12/2012 |

OTHER PUBLICATIONS

International Search Report (PCT/ISA/210) issued in PCT Application No. PCT/EP2015/052968 dated Apr. 21, 2015, with English translation (four (4) pages).

German Search Report issued in counterpart German Application No. 10 2014 206 739.1 dated Nov. 27, 2014, with partial English translation (fifteen (15) pages).

* cited by examiner

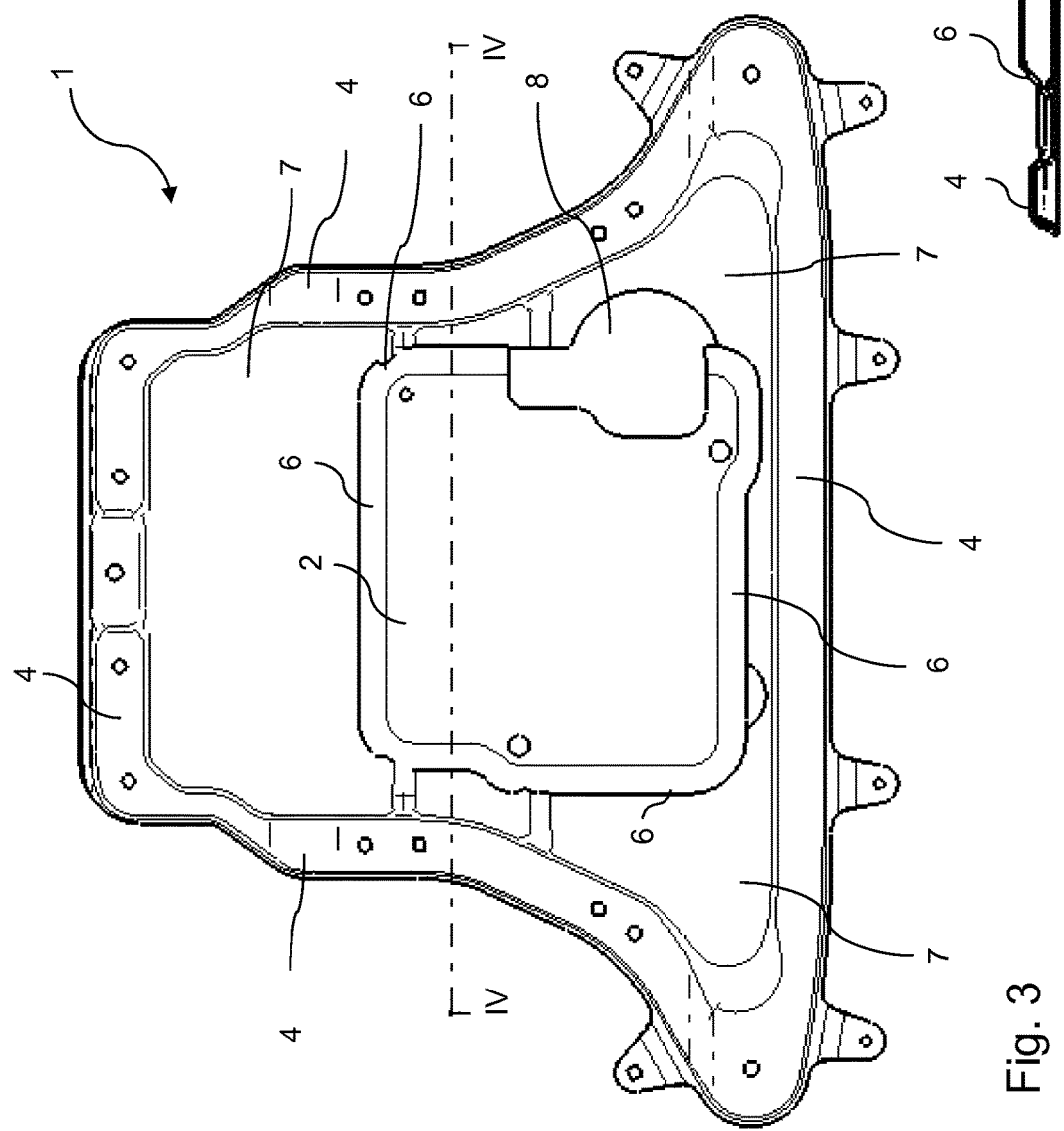

SHEAR PANEL WITH SECONDARY COIL FOR A FORWARD STRUCTURE OF A BODY OF A VEHICLE, AND VEHICLE

CROSS REFERENCE TO RELATED APPLICATIONS

This application is a continuation of PCT International Application No. PCT/EP2015/052968, filed Feb. 12, 2015, which claims priority under 35 U.S.C. §119 from German Patent Application No. 10 2014 206 739.1, filed Apr. 8, 2014, the entire disclosures of which are herein expressly incorporated by reference.

BACKGROUND AND SUMMARY OF THE INVENTION

Embodiments of the invention relate to a shear panel for a forward structure of a body of a vehicle and to a vehicle. In particular, embodiments of the invention relate to battery-operated vehicles system or hybrid-electric vehicles, specifically to the group of so-called plug-in hybrid-electric vehicles (PHEVs).

PHEVs have a secondary coil of an inductive energy transmission system for charging an electric energy accumulator of the vehicle. The energy transmission to the secondary coil takes place inductively by means of a primary coil of the energy transmission system, which primary coil is integrated, for example, in a garage or at a parking space in the ground or is placed on the latter. The secondary coil of the energy transmission system is mechanically fastened to the vehicle underbody. If, for the purpose of parking, the vehicle is parked, for example, in a garage or in a specific parking space, the secondary coil of the vehicle comes to be situated at a distance from the primary coil of the energy transmission system. If it is ensured that the secondary coil of the vehicle is arranged within a predefined tolerance range in a predefined manner with respect to the primary coil of the energy transmission system, a charging of the energy accumulator of the vehicle electrically coupled with the secondary coil can take place. The tolerance range is a function of the used technology of the energy transmission system.

In order to be able to achieve an operation of the vehicle that is as economical as possible, efficiency with respect to the energy transmission from the primary coil to the secondary coil that is as high as possible is required. On the other hand, the secondary coil integrated in the vehicle has to be as small and light as possible, in order to achieve an integration that is as simple as possible as well as an efficient operation. This requirement is met, for example, by energy transmission systems which utilize magnetic resonance technology.

In addition, in the case of the integration of an inductive energy transmission system (i.e. of the secondary coil) in a vehicle, separate measures are required for the electromagnetic shielding in order to meet legal demands (ICNIRP). This applies particularly to vehicles with a non-metallic vehicle body or vehicle occupant compartment (so-called life unit). For an efficiency of the energy transmission that is as high as possible, measures are additionally required for optimizing the overall impedance of the resonator and of the resonant circuit. In this case, several marginal conditions should be taken into account:

Depending on the vehicle type or vehicle architecture, more installation space for the integration of the secondary coil is available behind the rear axle or under the trunk than under the front axle support. However, the electromagnetic stray field, in the case of an integration under the rear axle per se, extends clearly beyond the vehicle rear, as a result of a higher underbody clearance and smaller metal masses of the vehicle body in comparison to the front axle support, etc. Merely for reasons of electromagnetic (EM) shielding, it is therefore advantageous in the case of most vehicle architectures, in which an internal-combustion engine is arranged in the front, to mount the secondary coil under the or in the area of the front axle. There are also other advantages, such as easier parking in a parking space, higher energy transmission efficiency because of less underbody clearance, etc.

However, because of the geometrical and thermal marginal conditions, the integration under the or in the area of the front axle is, as a rule, clearly more difficult than under the rear axle.

It is an object of the embodiments of the present invention to indicate a functionally and/or constructively better integration of a secondary coil of an energy transmission system in a vehicle.

This and other objects are achieved by a shear panel for a forward structure of a vehicle, particularly a battery-driven vehicle (BEV) or a plug-in hybrid-electric vehicle (PHEV), in which the shear panel consists of metal having a receiving area with fastening devices for the mechanical fastening of a secondary coil of an inductive energy transmission system for charging an electric energy accumulator of the vehicle.

In particular, the energy transmission system, as initially described, utilizes the known technology of magnetic resonance. In the case of such an energy transmission system, the secondary coil comprises a ferrite core, a first plate made of a first metal (copper) for the field guidance and shielding of the magnetic field, and a second plate made of a second metal (aluminum) for the impedance adaptation and shielding of the magnetic field. In the case of such a construction, the secondary coil can be provided with small dimensions, so that it can be integrated in the area of the forward structure of the vehicle body, although little space is normally available in this area. An energy transmission system based on magnetic resonance technology is basically less susceptible with respect to a misalignment (i.e. a lateral offsetting of the primary and secondary coil in the longitudinal direction of the vehicle and/or in the transverse direction of the vehicle) than a conventional energy transmission system based on the transformer principle. Nevertheless, high efficiency can be achieved with respect to the energy transmission.

According to the embodiments of the invention, a secondary coil, which is constructed in this fashion is arranged at shear panel. A shear panel is a stiffening of the forward structure, which connects pivot points of a front axle link with the floor assembly. The thereby achieved stiffening effect causes a precise response of the steering. In addition to the mechanical mounting for the secondary coil, the shear panel can simultaneously carry out the task of an electromagnetic shielding for meeting legal and/or medical demands on field intensities in the vehicle occupant compartment. This is particularly advantageous in the case of vehicles having a non-metallic vehicle body.

One advantage of this approach is the fact that the shear panel can additionally be utilized for an impedance adaptation of the vehicle-side magnetic field resonator or resonant circuit. As a result, the shear panel represents an inductive impedance adaptation and integration component. The shear panel therefore takes on the field guidance, the field shielding and the mechanical integration. In addition, this can be advantageously utilized for designing the housing of the secondary coil in a more slender fashion, whereby the secondary coil, in turn, can have a smaller and lighter construction.

According to a useful further development, when the secondary coil is fastened to the receiving area of the shear panel, the shear panel thereby replaces a component of the secondary coil having functional characteristics and assumes its functional characteristics. For example, a plate of the secondary coil, which is provided for the field guidance and/or impedance adaptation, can be replaced by the shear panel as a result of taking on this function.

Additionally, the receiving area may be situated in an identical plane as other areas of the shear panel adjoining the receiving area and surrounding the latter. In other words, the shear panel may be developed as a straight plate.

Alternatively, the receiving area can be situated in a different plane than other areas of the shear panel adjoining the receiving area and surrounding the latter. The other areas of the shear panel adjoining the receiving area and surrounding the latter will be called "surrounding areas" in the following description. In this case, the plane of the receiving area is arranged by a predefined distance from the plane of the other areas of the shear panel adjoining the receiving area and surrounding the latter. The predefined distance may also be called depth or offsetting of the receiving area with respect to the surrounding areas. In other words, the receiving area represents an indentation with respect to the surrounding areas. In the installed condition of the shear panel, the receiving area has a greater distance from the ground than the surrounding areas.

The plane of the receiving area and the plane of the other areas adjoining the receiving area and surrounding the latter (surrounding area) are connected by way of a diagonally extending transition section, whereby an angle $\alpha$ formed between the plane of a respective surrounding area and the transition section meets the following conditions: $20°<\alpha<55°$, particularly $25°<\alpha<40°$. The transition section surrounds the receiving area particularly at least in sections, and may even completely surround the latter.

The determination of the size of the angle, which is formed between the plane of a respective surrounding area and the transition section, depends on various factors:

It is useful for the angle $\alpha$ to be sufficiently small in order to permit good field guidance such that the density of the effective magnetic field in the interior of the secondary coil is maximized. The effective field is equal to the vectorial sum of the field generated by the primary coil and the opposite field (Lenz's Law), which is generated by the induction of eddy currents in the shear panel. If the angle $\alpha$ and other parameters can be implemented in an optimized manner, the efficiency of the energy transmission can be increased in comparison to an integration without a shear panel.

Frequently, practical circumstances stand in the way of the optimized implementation of the angle $\alpha$, as, for example, narrow space conditions above the shear panel (for example, because of an oil pan, etc.), whereby only large angles $\alpha$, such as $\alpha=55°$, can be implemented. With respect to the field guidance, such large (steep) angles $\alpha$ are suboptimal, because a large or steep angle reduces the efficiency of the energy transmission in comparison to a smaller angle $\alpha$.

If, because of the geometrical marginal conditions, the angle $\alpha$ has to be selected to be larger than the angle $\alpha$ that is optimal with respect to the energy transmission efficiency, the field guidance can be further improved by using additional ferrites at the input/output of the secondary coil. For this purpose, the ferrites can be integrated in the gap under the diagonally extending transition section of the shear panel and the secondary coil.

Additionally, the predefined distance between the plane of the receiving area and one of the respective surrounding areas may maximally correspond to the height of the secondary coil. In this configuration, the side of the secondary coil facing the ground may be situated in one plane with the respective surrounding area or may have a smaller distance to the ground than the surrounding areas when the shear panel is arranged on the forward structure of the vehicle body.

In this context, it may be useful for the predefined distance to be between 25% and 100%, and particularly between 5% and 75%, of the height of the secondary coil. When the distance is 100%, the main side of the secondary coil facing the ground in the installed condition of the shear panel is situated in the plane of the surrounding areas of the shear panel. In all other cases, the main surface of the secondary coil facing the ground projects beyond the surrounding areas and has a smaller distance from the ground.

Moreover, the angle of the transition section in the direction of a coil axis or axis of vibration is smaller than transversely thereto. Smaller means in this case that the angle is flatter with respect to a plane which, in the installed condition of the shear panel, is approximately parallel to the ground.

In order to provide a field shielding that is as good as possible, the shear panel is preferably formed of aluminum. At least in the receiving area of the secondary coil, the thickness of the material of the shear panel amounts to at least 1 mm. A sufficient field shielding is thereby ensured. For reasons of the stability of the shear panel, it is advantageous for the thickness of the material to amount to more than 2 mm.

Additionally, a copper layer is provided on the side of the receiving area on which the secondary coil is fastened. It thereby becomes possible to also omit the initially mentioned first plate of the first material for the guidance and shielding of the magnetic field in the secondary coil, which results in a lower height of the construction of the secondary coil and in a lower weight.

Moreover, it is provided that the shear panel projects laterally beyond the boundaries of the secondary coil. In particular, the shear panel may project on all sides of the secondary coil laterally beyond its boundaries, in order to permit the best possible field shielding. Furthermore, the circumstance that, in addition to the task as an inductive impedance adaptation and integration component intended for the shear panel, the latter now represents or can represent a constructive mechanical component of the vehicle, results in the fact that, for providing a predefined stability, the shear panel has to have corresponding reinforcements which, particularly surrounding the edge, constructively extend around the receiving area of the secondary coil.

It is further useful for the length of the shear panel projecting beyond the boundaries of the secondary coil to amount to approximately 50% of the dimension of the secondary coil in this direction. This applies particularly to the direction of the magnetic field (B-field vector).

A vehicle, particularly a battery-driven vehicle or a plug-in hybrid-electric vehicle, comprises a secondary coil of an inductive energy transmission system for charging an electric energy accumulator and a shear panel which is arranged in a forward structure of the vehicle. According to the embodiments of the invention, the secondary coil is integrated in the shear panel that is constructed as described above. As described above, the shear panel is arranged in the area of the front axle support of the vehicle.

Relative to a vertical axis of the vehicle, the secondary coil may be arranged on the side of the shear panel directed toward the road. As a result, the shear panel can take on, in addition to the impedance adaptation and the fastening of the secondary coil, also the electro-magnetic shielding toward the vehicle occupant compartment.

Additionally, the shear panel is situated in the center on a longitudinal axis of the vehicle, the secondary coil being centered with respect to the shear panel. This makes it possible for the driver to position the secondary coil in a manner that is as simple as possible above a primary coil of the energy supply system, which is integrated on or in the ground of the vehicle parking space.

Moreover, the plane of the receiving area is farther away from a ground to be traveled by the vehicle than the plane of the surrounding areas of the shear panel.

Summarizing, it is therefore suggested to integrate the secondary coil for the transmission of electro-magnetic field energy in a vehicle in a shear panel and to utilize the latter as the inductive impedance adaptation and integration component. In addition to the mechanical mounting of the secondary coil, the shear panel thereby takes on the tasks of the electro-magnetic shielding for meeting legal and/or medical demands on the field intensity in the vehicle occupant compartment as well as the impedance adaptation of the vehicle-side magnetic field resonator or resonator circuit.

The impedance adaptation of the vehicle-side magnetic field resonator or resonator circuit permits an optimization of the efficiency of the energy transmission and a lower weight of the secondary coil, because at least one metallic plate provided there can be eliminated as a result of the utilization of the functionality of the shear panel, as well as a lower installation height by dispensing with separate impedance adaptation measures in the secondary coil. The impedance adaptation measures can be implemented completely by the shear panel in that a corresponding further development of the receiving area as well as of the transition section to the surrounding areas takes place. For this purpose, the shear panel is further developed such that it takes on a field-guiding function. The total impedance of the resonant circuit can thereby be optimized.

In addition, the heat capacity of the integrated secondary coil can be increased by the shear panel. At sufficiently low ambient temperatures of less than 80° C., the shear panel is used as a heat sink. As a result of the high thermal conductivity of the material of the shear panel, the shear panel provides a uniform heat distribution even at higher ambient temperatures. In this manner, hot spots, i.e., areas of local overheating, can be prevented.

Other objects, advantages and novel features of the embodiments of the present invention will become apparent from the following detailed description of one or more preferred embodiments when considered in conjunction with the accompanying drawings, in which:

BRIEF DESCRIPTION OF THE DRAWINGS

FIG. 3 is a bottom view of the shear panel;
and
FIG. 4 is a cross-sectional view of the shear panel in FIG. 3 along line IV-IV.

DETAILED DESCRIPTION OF THE DRAWINGS

Figure 1:
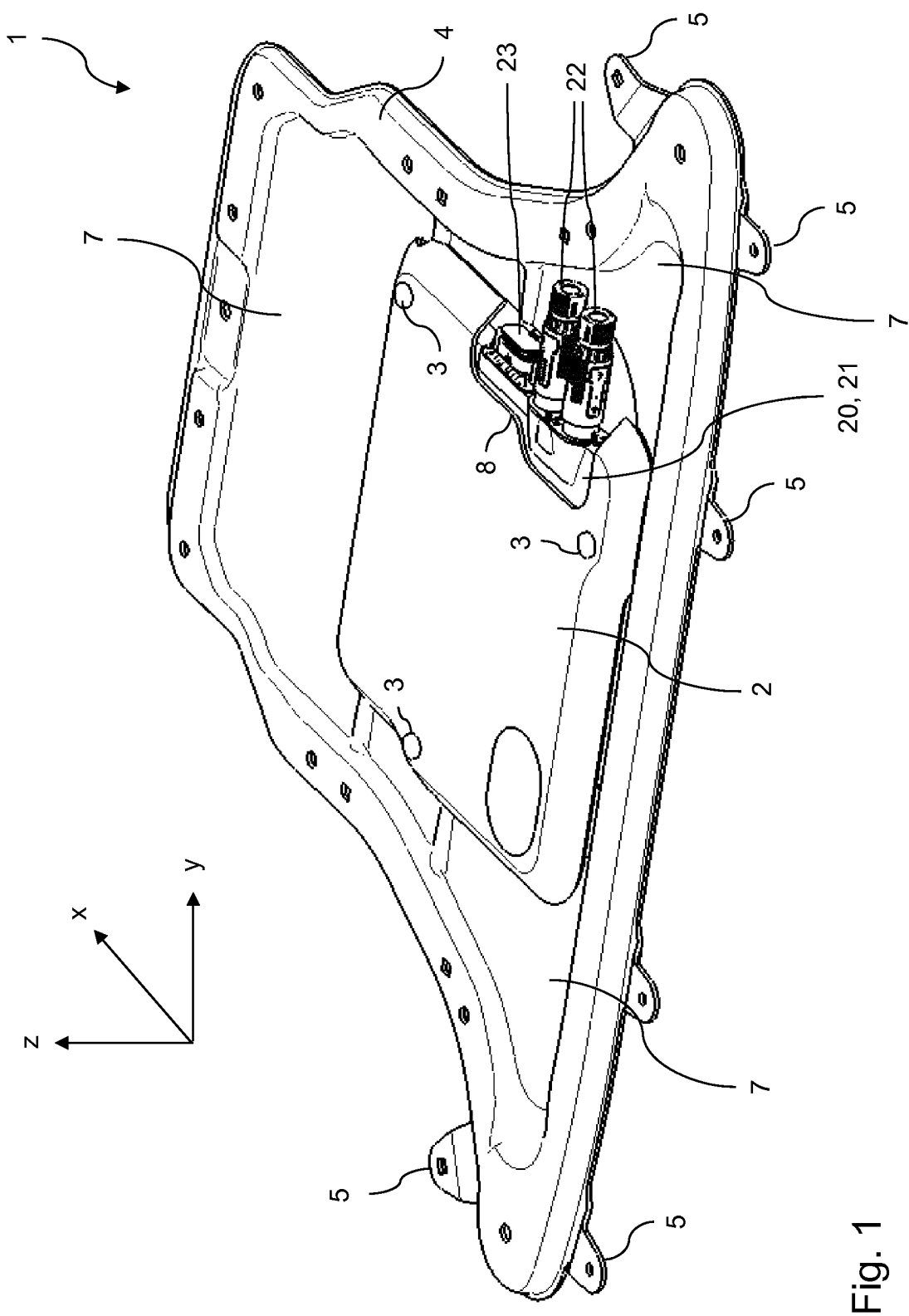
FIG. 1 is a perspective view of a shear panel.

FIG. 1 is a perspective representation of a shear panel 1 according to an embodiment of the invention. The shear panel 1 is provided for the arrangement on a forward structure, which is not shown, of a body of a vehicle, which is also not shown. The exterior shape of the shear panel 1 essentially follows the constructive design of the forward structure of the vehicle body. In general, the shear panel 1 is a component for stiffening the forward structure. The shear panel 1 therefore has a deformation or shaping over its entire circumference for generating the required stiffness. The shear panel 1 has several fastening clips 5 distributed over the outer edge, so that, in a known manner, the shear panel 1 can be fastened, for example, by means of screws or bolts, to the forward structure of the vehicle body. In this case, the pivot points of the forward structure control arm are connected with a floor assembly of the vehicle body. In a known manner, a more precise response of the steering can thereby be achieved because of the stiffening of the forward structure. In order to be able to achieve the stiffening to the desired extent, the shear panel 1 consists of aluminum of a thickness of between 2 and 3 mm. In this case, the material thickness may be different in different areas of the shear panel. The shear panel 1 may generally be produced of one piece or of several mutually connected parts.

The installation position of the shear panel 1 illustrated in FIG. 1 is shown by means of the coordinate system shown in FIG. 1. In this case, x indicates the longitudinal vehicle axis; y indicates the transverse vehicle axis; and z indicates the vertical vehicle axis. In other words, x points in the traveling direction of the vehicle toward the front; y points toward the right and z points upwards.

The shear panel 1, only as an example, has a rectangular receiving area 2, the plane of the receiving area 2 being arranged in an offset manner with respect to the other areas of the shear panel surrounding the receiving area (the so-called surrounding areas). The offsetting is generated, for example, by a deformation of the starting material of the shear panel 1, for example, by shaping. The direction of the deformation of the receiving area 2 corresponds to the direction of the deformation of the deformed edge 4. The surrounding areas 7 may be situated in a common plane, although this is not absolutely necessary.

The size and shape of the receiving area 1 corresponds approximately to the size of a secondary coil 21 of an inductive energy transmission system 20 for charging an electric energy accumulator of the vehicle. In the representation of FIG. 1, the secondary coil 21 is placed from below in the indented receiving area 2 and is fastened at the latter. For this purpose, fastening devices 3 are provided at the receiving area 2. The fastening devices 3 may be boreholes equipped with a thread, so that the secondary coil 21 can be screwed to the shear panel 1 through the boreholes. The fastening devices may also be screw bolts, so that the fastening of the secondary coil 21 takes place by means of nuts.

The receiving area 2 is provided with a recess or opening 8, the coil connections 22 and control connections 23 projecting through the opening 8 for the electric contacting of the secondary coil 21.

As described above, the receiving area 2, which is connected by way of circumferential transition sections or portions 6 with the respectively assigned surrounding area 7, may be a one-piece component of the shear panel 1. Alternatively, the receiving area could also be connected as a separate component in a frictional and/or interlocking and/or bonded manner with the shear panel 1.

Figure 2:
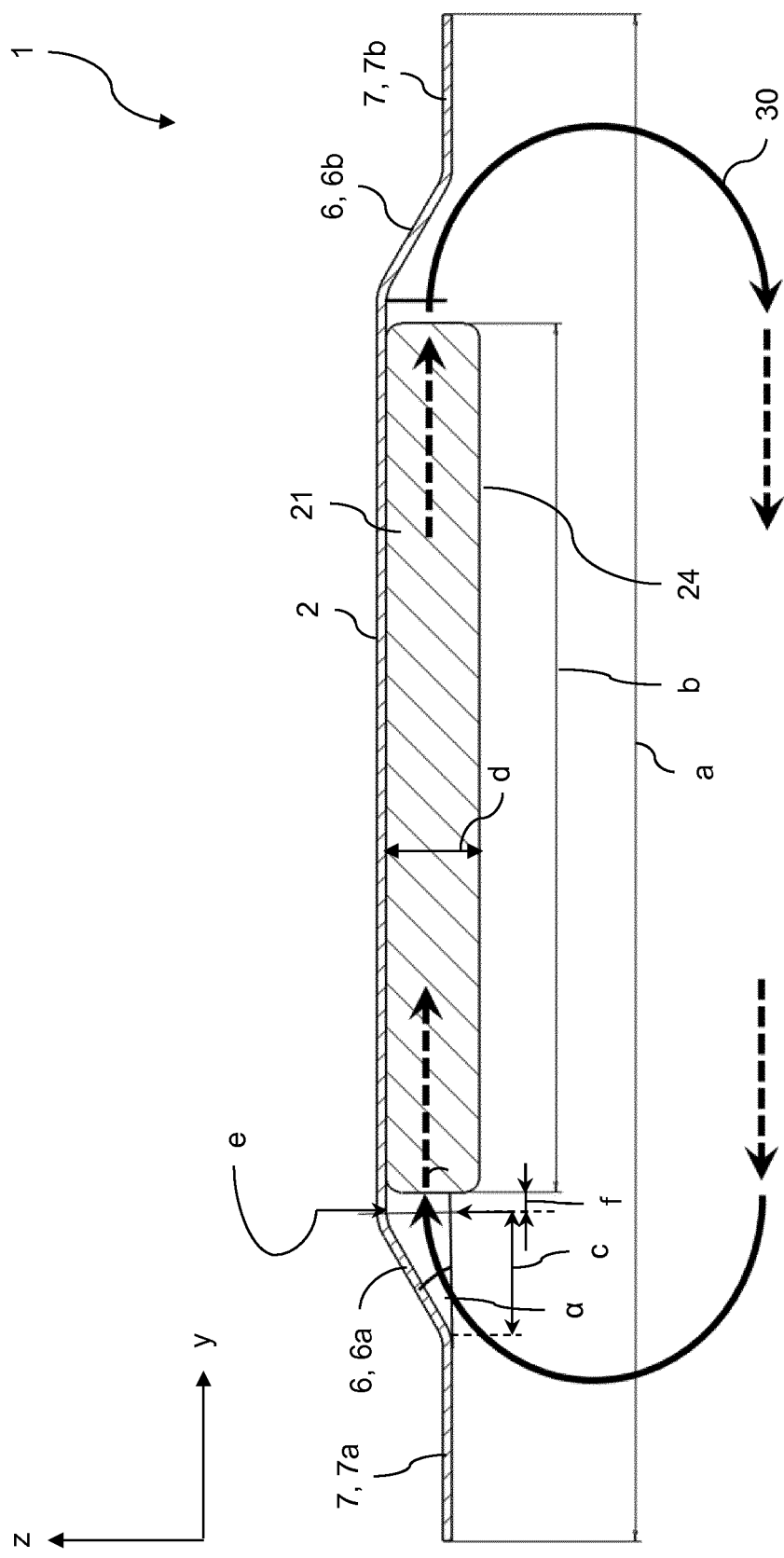
FIG. 2 is a sectional view of the shear panel.

FIG. 2 is a sectional view of the shear panel in the y-z plane. It is easily recognizable here that the plate-shaped secondary coil 21 of the energy transmission system not shown in detail as a whole is arranged in the indented receiving area 2.

The depth e (a.k.a. predefined distance) of the receiving area 2 with respect to the plane of the surrounding areas 7 (i.e. the distance between the plane of the receiving area 2 and the surrounding areas 7a, 7b) preferably amounts to 0.5 d to d, wherein "d" is the height of the secondary coil 21. 7a indicates the surrounding area arranged in FIG. 2 to the left of the receiving area 2; 7b indicates the surrounding area arranged in FIG. 2 to the right of the receiving area 2. The surrounding areas are situated in a common plane (surrounding plane). They may basically also be arranged in different planes. In the most extreme case, i.e., d=e, a main side 24 of the secondary coil, which in the installed condition of the shear panel 1 in the vehicle, faces a ground (road), is situated in the plane of the surrounding areas 7.

In principle, e=0 can be selected; i.e., the plane of the receiving area 2 and the plane of the surrounding areas 7 are situated in a common plane. However, in this case, the field-guiding characteristic of the shear pan or of the indentation in which the secondary coil is arranged, would be dispensed with.

The width of the receiving area 2 corresponds approximately to a width b of the secondary coil 21. As described above, the receiving area 2 is connected by way of a respective transition section or area 6 (the transition section on the left in the figure has the reference number 6a; the transition section on the right in the figure has the reference number 6b) with the assigned surrounding area 7a, 7b. The angle α enclosed between the surrounding plane 7 and the respective transition section 6a, 6b determines, in connection with the distance e and a laterally extending transition section f, the impedance of the vehicle-side magnetic field resonator. FIG. 3 shows these characteristic parameters only for the left side of the indentation. The angle α may amount to between 10° and 45°, particularly 15° and 35°. The angle particularly is a function of the length of the lateral transition section f. In principle, it applies that f will be selected to be larger, the steeper the angle α. The precise selection of f, e and the angle α depends mainly on the installation situation in the vehicle. The course of the B-field 30 can be influenced by the course of the transition section 6, in order to achieve the best-possible coupling to a primary coil (not shown) of the energy transmission system. In particular, the efficiency of the coupling to the primary coil is adjusted here.

FIG. 3 is a view of the shear panel 1 from below. The centrally arranged receiving area 2 within the shear panel 1 is again clearly visible there. Also clearly visible is the opening 8 for the implementation of a coil connection and a control connection of the secondary coil 21.

FIG. 4 is a sectional view along the line IV-IV, which again outlines the indented receiving area 2 with respect to the surrounding areas of the shear panel 1.

The energy transmission system not shown in detail is based on magnetic resonance technology. The secondary coil 21 can thereby be provided with relatively small dimensions and a low weight. The secondary coil 21 generally comprises a ferrite core which is surrounded by a winding not shown in detail, as well as a copper plate for the field guidance and shielding of the magnetic field and an aluminum plate situated above the latter for the impedance adaptation and shielding of the magnetic field. At least one of the two layers can be substituted by the integration of the secondary coil 21 in the shear panel 1. If a corresponding copper layer is provided on the side of the receiving area 2 assigned to the secondary coil 21, both layers of the secondary coil 21 can be replaced. This reduces the weight and the thickness of the secondary coil 21.

The width b of the secondary coil 21 in the B-field direction amounts, for example, to 25 cm. The width a of the shear panel 1 in the B-field direction is approximately twice the width of the secondary coil 21, i.e. a=2*b. This means that the secondary coil 21 is approximately centrally integrated in the shear panel 1 in the transverse direction (y-axis) of the vehicle. The height of the secondary coil 21 amounts to approximately 2 cm. This means that the distance e is approximately 10 to 20 mm. The distance between the respective lateral edges of the secondary coil 21 and the transition section 6 is a function of the desired course of the B-field 30. This measurement can be determined by tests or simulated calculations. Likewise, the optimal distance e can be determined by tests or simulated calculations. In practice, the distance between the base of the angle α and the assigned lateral edge of the secondary coil 1 should be between 15 and 85 mm.

The integration of the secondary coil 21 for the transmission of electromagnetic field energy into the vehicle utilizes the shear panel 1 as the inductive impedance adaptation and integration component. On the one hand, the shear panel 1 is used as a mounting for the secondary coil 21. Because of the material (aluminum) and the thickness of the shear panel (between 2 and 3 mm), the shear panel, which extends in the transverse direction of the vehicle (Y-axis) in each case approximately 50% over the width b of the secondary coil 21, takes on the electromagnetic shielding for meeting legal and/or medical demands on the field intensities in the vehicle occupant compartment.

Generally, the material thickness, at least in the area of the receiving area 2, but preferably also beyond it in the lateral direction, has to be selected such that it is greater than the penetration depth of the electromagnetic field into the shear panel. In principle, the material thickness depends on the selected frequency of the energy transmission.

As a result of the shape of the receiving area 2 and of the transition section 6, an impedance adaptation of the vehicle-side magnetic field resonator or resonant circuit can take place. This results in a more efficient energy transmission. Because certain components can be absent from secondary coil since their function is provided by the shear panel, the secondary coil can be provided with a lower installation height and a lower weight. The impedance adaptation takes place by the shape of the receiving area 2 and the transition section 6, so that they take on a field-guiding function and thereby influence the total impedance of the resonant circuit in a desirable manner.

Finally, the shear panel 1 consisting of metal increases the thermal capacity of the secondary coil 21 fastened thereto. At sufficiently low ambient temperatures (<80° C.), the shear panel is therefore used as a heat sink. Furthermore, a uniform heat distribution and dissipation is ensured, so that hot spots can be avoided. This applies equally to the removal of heat during the operation of the energy transmission system as well as to the removal of heat of an internal-combustion engine. In the latter case, the heat generated by the internal-combustion engine, particularly after the parking of the vehicle, is removed from the secondary coil, which prevents or at least reduces an additional feeding of heat into electronic components in the secondary coil. The foregoing disclosure has been set forth merely to illustrate the embodiments of the invention and is not intended to be limiting. Since modifications of the disclosed embodiments incorporating the spirit and substance of the embodiments of the invention may occur to persons skilled in the art, the

What is claimed is:

1. A shear panel for a a body of a vehicle, the shear panel comprising:
a receiving area having fastening devices configured to mechanically fasten a secondary coil of an inductive energy transmission system which is configured to charge an electric energy accumulator of the vehicle, wherein
the shear panel is made of metal,
the receiving area is situated in a different plane than other areas of the shear panel adjoining the receiving area and surrounding the latter, the plane of the receiving area being arranged at a predefined distance from the plane of the other areas of the shear panel adjoining the receiving area and surrounding the latter, and
the plane of the receiving area and the plane of the other areas adjoining the receiving area and surrounding the surrounding areas are connected by way of a diagonally extending transition section, an angle (α) formed between the plane of a respective surrounding area and the transition section meeting a condition that 20°<α<55°.

2. The shear panel according to claim 1, wherein the receiving area is situated in an identical plane as other areas of the shear panel adjoining the receiving area and surrounding the latter.

3. The shear panel according to claim 1, wherein the predefined distance between the plane of the receiving area and the plane of the surrounding areas corresponds maximally to the height of the secondary coil.

4. The shear panel according to claim 1, wherein the angle (α) meets the condition that 25°<α<40°.

5. The shear panel according to claim 1, wherein, when the secondary coil is fastened to the receiving area of the shear panel, the shear panel replacing a component of the secondary coil having functional characteristics and assuming said functional characteristics.

6. The shear panel according to claim 5, wherein the receiving area is situated in an identical plane as other areas of the shear panel adjoining the receiving area and surrounding the latter.

7. The shear panel according to claim 5, wherein the receiving area is situated in a different plane than other areas of the shear panel adjoining the receiving area and surrounding the latter, the plane of the receiving area being arranged at a predefined distance from the plane of the other areas of the shear panel adjoining the receiving area and surrounding the latter.

8. The shear panel according to claim 5, wherein the functional characteristics of the component of the secondary coil that is replaced by the shear panel is a field-guiding function to thereby influence the total impedance of the resonant circuit in a desirable manner.

9. The shear panel according to claim 1, wherein the predefined distance between the plane of the receiving area and the plane of the surrounding areas corresponds maximally to the height of the secondary coil.

10. The shear panel according to claim 9, wherein the predefined distance is between 25% and 100% of the height of the secondary coil.

11. The shear panel according to claim 10, wherein the angle (α) of the transition section is smaller in the direction of a coil axis/axis of vibration than transversely thereto.

12. The shear panel according to claim 11, wherein the shear panel is formed of aluminum.

13. The shear panel according to claim 12, wherein the thickness of the material of the shear panel amounts to at least 1 millimeter at least in the receiving area of the secondary coil.

14. The shear panel according to claim 13, wherein a copper layer is provided on the side of the receiving area on which the secondary coil is fastened.

15. The shear panel according to claim 14, wherein the shear panel projects laterally beyond the boundaries of the secondary coil.

16. The shear panel according to claim 15, wherein the length of the shear panel projecting beyond the boundaries of the secondary coil in a transverse direction amounts to approximately 50% of the dimension of the secondary coil in the transverse direction.

17. A battery-driven vehicle or plug-in hybrid-electric vehicle, comprising:
a secondary coil of an inductive energy transmission system configured to charge an electric energy accumulator and a shear panel, which is arranged in the vehicle, wherein
the secondary coil is integrated in the shear panel, which is constructed according to claim 16.

18. The vehicle according to claim 17, wherein the shear panel is situated in the center on a longitudinal axis of the vehicle, the secondary coil being centered with respect to the shear panel.

19. The vehicle according to claim 18, wherein a plane of the receiving area is on a different plane than a plane of the surrounding areas.

20. The shear panel according to claim 10, wherein the predefined distance is between 25% and 75% of the height of the secondary coil.

21. The shear panel according to claim 13, wherein the thickness of the material of the shear panel amounts to at least 2 millimeters at least in the receiving area of the secondary coil.

22. The vehicle according to claim 17, wherein the secondary coil is arranged on the side of the shear panel directed toward the road, relative to the vertical axis of the vehicle.

* * * * *